Oct. 26, 1948.   B. C. COIT, JR   2,452,356
PALLET OF THE LOAD-SUPPORTING TYPE, WITH CASTERS
Filed May 21, 1947   2 Sheets-Sheet 1

Inventor
BURTON C. COIT, JR
By Archworth Martin
his Attorney

Oct. 26, 1948.   B. C. COIT, JR   2,452,356
PALLET OF THE LOAD-SUPPORTING TYPE, WITH CASTERS
Filed May 21, 1947   2 Sheets-Sheet 2

Inventor
BURTON C. COIT, JR.
Archworth Martin
his Attorney

Patented Oct. 26, 1948

2,452,356

UNITED STATES PATENT OFFICE 2,452,356

PALLET OF THE LOAD-SUPPORTING TYPE, WITH CASTERS

Burton C. Coit, Jr., Washington, Pa., assignor to Tri-State Engineering Company, Washington, Pa., a corporation of Maryland Application May 21, 1947, Serial No. 749,501

7 Claims. (Cl. 248—120)

This invention relates to pallets of the portable deck type which are used in the moving and storing of goods, and has for one of its objects the provision of a pallet that can conveniently be rolled along a floor for short distances, as when receiving goods from the discharge end of a conveyor; which can readily be lifted and transported by various types of lift trucks, and which can conveniently be used either with or without crate sides and stacked on other pallets.

Another object of my invention is to provide a pallet deck structure of such form that it is in a nature of a truss, so that adequate strength is secured for a minimum vertical depth, whereby there is ample clear space between the underside of the deck structure and the floor upon which it rests, and between legs or wheels that support the pallet.

This application constitutes a modification of the structures shown in my applications Ser. No. 726,687, filed February 5, 1947, and Ser. No. 731,063, filed February 26, 1947.

Figure 1:
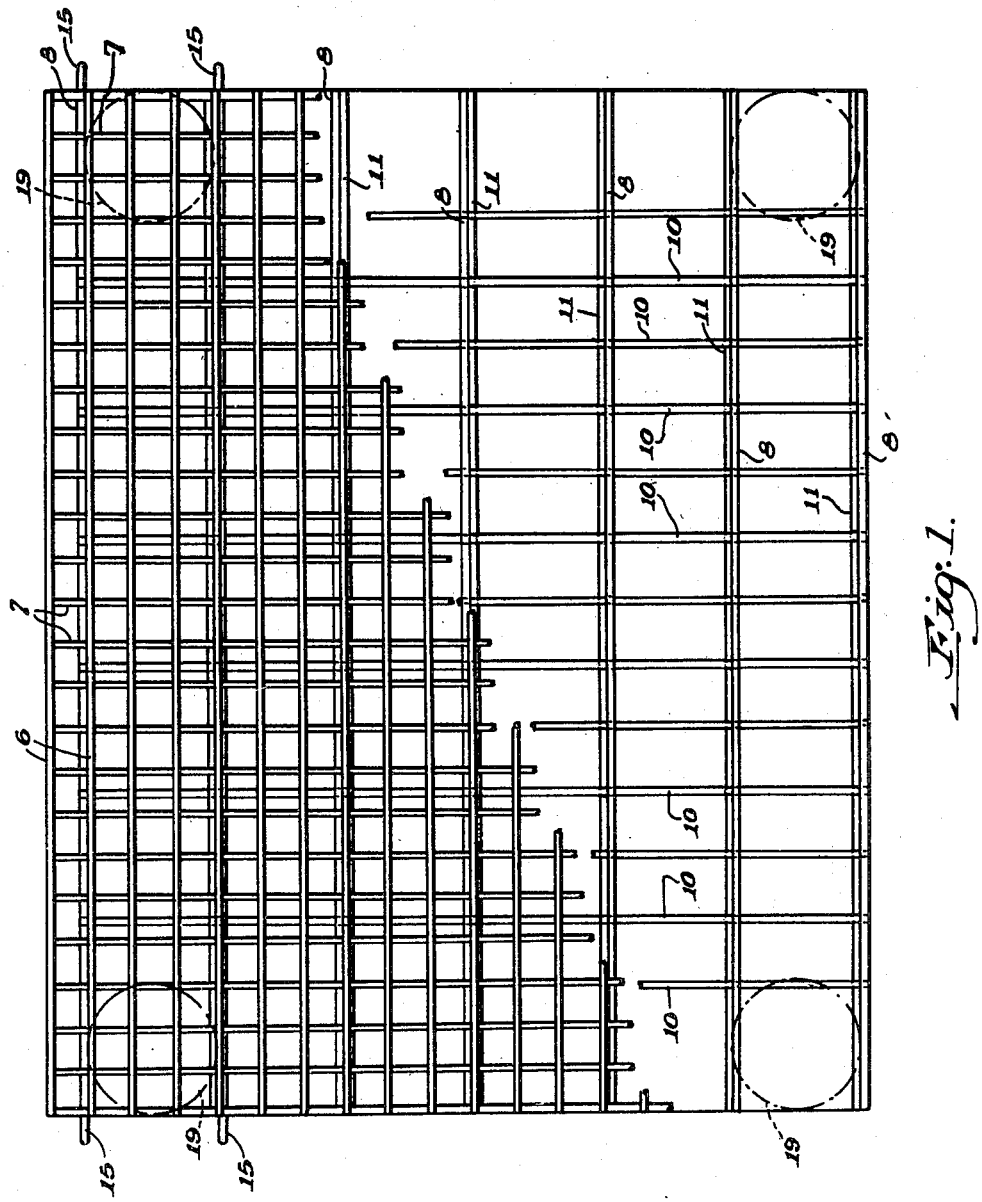
Figure 2:
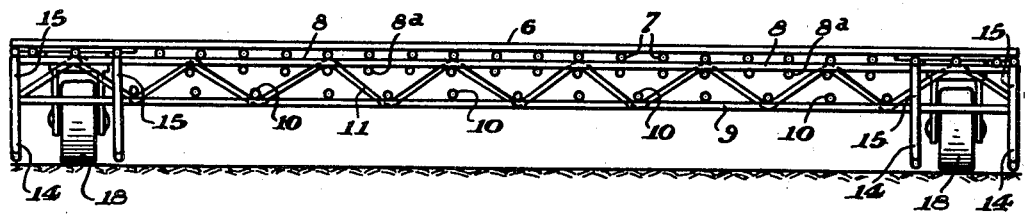
Figure 3:
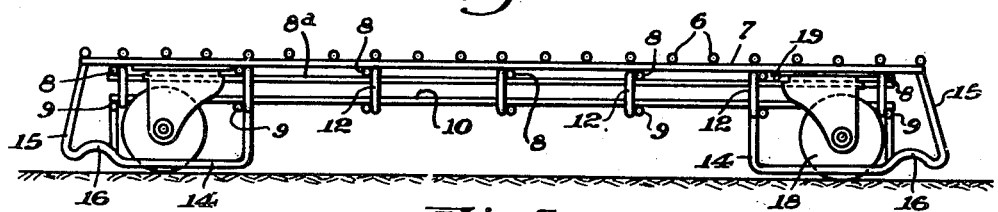
Figure 4:
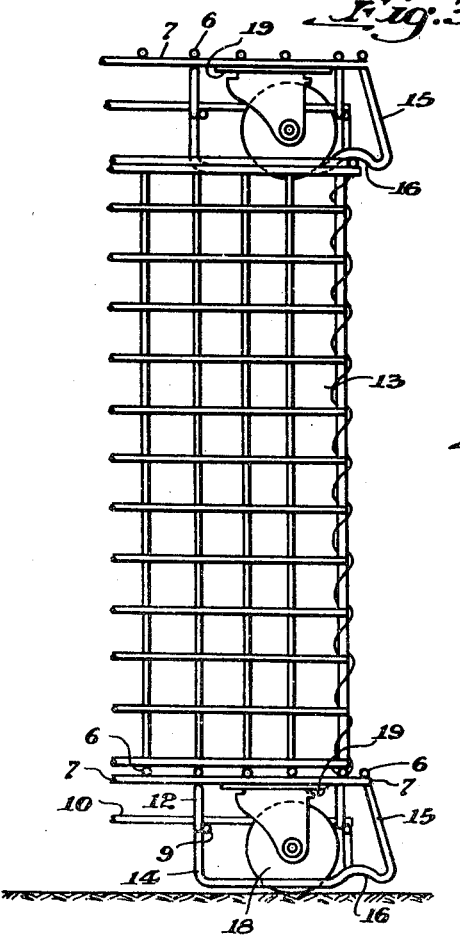

In the accompanying drawings, Figure 1 is a plan view of a pallet deck constructed according to my invention, with portions of the load-receiving surface broken away to expose certain of the truss members; Fig. 2 is a side view of the structure of Fig. 1; Fig. 3 is an end view thereof, and Fig. 4 is a view of a portion of two pallets and a crate, showing the manner in which pallets may be stacked upon crates that are carried by other pallets.

The deck structure comprises a mesh sheet having longitudinally-extending rods or heavy wires 6 that overlie and are welded to transversely-extending rods 7. Reinforcing rods 8 are welded to the undersides of the wires 7, and rods 8a are welded to the undersides of the rods 8. To form part of the truss structure, longitudinally-extending rods 9 are welded to the undersides of transversely-extending rods 10, thus forming an underframe. Rods 11 that serve as tension and compression members in the truss structure are arranged on diagonal lines, their upper angles being welded to the rods 7 and 8 and their lower angles being welded to the rods 9. The members 11, as shown in Fig. 2, can be made of continuous rods bent to angular form at intervals, or can consist of a series of short rods welded to the members 7, 8 and 9. At the ends of the deck, the members 11, when continuous, can be bent up as shown at 12 and the extremities of the bent-up portions being welded to the rods 7 and 8 as shown more clearly in Fig. 2. These portions 12 can be in the form of short rods instead of being continuations of the members 11.

The deck rods 6—7 may suitably be of No. 2 gauge wires and the underframe rods of 0 gauge. The rods 8 and 9 serve as top and bottom cords of the truss structure. The rods 8 are, in effect, in tension and compression when under load on the pallet, owing to the fact that they are under tension with respect to the deck rods 6 and under compression with respect to the rods 9.

Similarly, the transversely-extending rods 8a are placed under tension with respect to the wires 7 and under compression with respect to the rods 10, when a load is placed on the pallet.

The rods 8 and 8a thus serve dual purposes, as tension and compression members in longitudinal and transverse sections respectively, and therefore provide a structure of great rigidity and strength, for a given amount of material.

Leg-like extensions are provided at the corners of the pallet structure. These devices comprise a pair of rods 14 of generally U-form at each corner of the structure. The inner legs of these rods are welded to the rods 9 and 10, and the outer legs 15 thereof are welded to the rods 7. The lower portions of the rods are bent to form curved recesses at 16 whereby they facilitate stacking of the pallets on crates 13 of other pallets as shown in Fig. 4. Strut members 17 welded to the bends 16 and the adjacent rods 9 assist in transmitting loads from the legs to the underframe 9—10. These members 14 ordinarily support the pallet deck only when the pallets are stacked as shown in Fig. 4. The crate 13 will preferably be detachably connected to its pallet as in my said applications. These leg members 14—15 will be omitted in case the customer does not desire to stack pallets in the manner shown in Fig. 4.

When on a floor, the pallet is supported by casters 18 that have swiveling movement on their base plates 19 that are welded to the rods 7, in the manner disclosed in my said application Ser. No. 731,063. While these casters are shown as located at the corners of the structure, they obviously can be placed at other locations beneath the deck.

The trussed deck and underframe structure is here shown as formed of metal rods or wires, but can be made of wood, or structural or rolled or pressed steel parts.

It will be seen that the pallets can be rolled easily along a factory floor to receive loads. For example, a number of these can be moved in succession to pass the discharge end of a conveyor or an assembly line, to receive articles.

Thereafter, lift trucks of various suitable types can readily be moved beneath the bars 9 and 10, from either side or the ends of the pallets, for transportation to a warehouse or loading platform.

I claim as my invention:

1. A pallet comprising a deck portion having an underframe connected thereto by truss elements, leg-like elements secured to the underframe and the deck at each corner thereof and extending below the underframe, and wheels disposed between the leg elements at the various corners and extending below the lowermost plane of said elements, but with their axes located a substantial distance above said plane.

2. A pallet comprising a deck portion having an underframe connected thereto by truss elements, leg-like elements secured to the underframe and the deck at each corner thereof and extending below the underframe, and wheels disposed between the leg elements at the various corners and extending below the lowermost plane of said elements, but with their axes located a substantial distance above said plane, the leg elements having portions extending outwardly from said wheels in position to be supported by crate walls upon which the pallet may be superimposed.

3. A pallet comprising a deck portion having an underframe connected thereto by truss elements, leg-like elements secured to the underframe and the deck and extending below the underframe, and wheels disposed in proximity to the leg elements and extending below the lowermost plane of said elements, but with their axes located a substantial distance above said plane, the leg elements being U-shaped and arranged in pairs at each corner of the structure and each wheel being located between one of the pairs.

4. A pallet comprising a deck, chord rods below the deck, means rigidly connecting the rods to the deck at a plurality of points longitudinally of the rods, with the rods spaced a substantial distance below the deck, other chord rods disposed a substantial distance below the first-named rods and in parallelism therewith, and truss members rigidly connecting the lower rods to the upper rods at a plurality of longitudinally-spaced points.

5. A pallet comprising a deck formed of longitudinally and transversely extending wires welded to mesh form, with one set of wires in superposed relation to the other, chord rods extending parallel to the wires of one set and rigidly secured to the deck, below and in vertically-spaced relation to the wires of said one set, chord rods spaced below the first-named chord rods and disposed in parallelism therewith, and truss members rigidly connecting the lower chord rods to the upper chord rods.

6. A pallet comprising a deck, chord rods below the deck, means rigidly connecting the rods to the deck at a plurality of points longitudinally of the rods, with the rods spaced a substantial distance below the deck, other chord rods disposed a substantial distance below the first-named rods and in parallelism therewith, truss members rigidly connecting the lower rods to the upper rods at a plurality of longitudinally-spaced points, and floor-engaging members for supporting the lower chords in vertically-spaced relation to a floor.

7. A pallet comprising a deck of mesh-like form having four groups of rods arranged in relatively-superposed relation, the rods of each group being laterally spaced in a common plane and the rods in each group extending transversely of and being welded to the rods with which they have superposed engagement, and leg elements connected to the deck and extending downwardly therefrom.

BURTON C. COIT, JR.

REFERENCES CITED

The following references are of record in the file of this patent:

UNITED STATES PATENTS

| Number | Name | Date |
|---|---|---|
| 1,587,573 | Young | June 8, 1926 |
| 1,770,614 | Hennessy | July 15, 1930 |
| 2,148,150 | Clark | Feb. 21, 1939 |
| 2,430,267 | Arthur | Nov. 4, 1947 |

OTHER REFERENCES

The Palletizer, June 1946, page 33 (Tri-State Engineering Co., Washington, Penna.) (Copy in Division 52.)